(12) United States Patent
Demnard

(10) Patent No.: US 9,553,629 B2
(45) Date of Patent: Jan. 24, 2017

(54) PROTECTIVE IMPLEMENT FOR ELECTRONIC DEVICES

(71) Applicant: Dylan Demnard, Boca Raton, FL (US)

(72) Inventor: Dylan Demnard, Boca Raton, FL (US)

( * ) Notice: Subject to any disclaimer, the term of this patent is extended or adjusted under 35 U.S.C. 154(b) by 0 days.

(21) Appl. No.: 14/989,110

(22) Filed: Jan. 6, 2016

(65) Prior Publication Data

US 2016/0197638 A1  Jul. 7, 2016

Related U.S. Application Data

(60) Provisional application No. 62/100,277, filed on Jan. 6, 2015, provisional application No. 62/256,021, filed on Nov. 16, 2015.

(51) Int. Cl.
*H04B 1/3888* (2015.01)
*A45C 11/38* (2006.01)
*A45C 11/00* (2006.01)

(52) U.S. Cl.
CPC ........... *H04B 1/3888* (2013.01); *A45C 11/38* (2013.01); *A45C 2011/001* (2013.01); *A45C 2011/002* (2013.01); *A45C 2011/003* (2013.01)

(58) Field of Classification Search
CPC ......... H04B 1/3888; H04M 1/11; H04M 1/14; H04M 1/0206
See application file for complete search history.

(56) References Cited

U.S. PATENT DOCUMENTS

| | | | | |
|---|---|---|---|---|
| 4,988,083 A * | 1/1991 | Bradley | ............... | B65D 81/056 114/219 |
| 5,065,972 A * | 11/1991 | Buckshaw | ........... | A47B 95/043 206/586 |
| 5,361,948 A * | 11/1994 | Batts | .................... | A47G 25/485 223/91 |
| 2014/0076753 A1* | 3/2014 | Limber | ................ | H04B 1/3888 206/320 |

OTHER PUBLICATIONS

NPL-1 www.trendhunter.com—Silly Putty Tech Protector—Aug. 30, 2011.*

* cited by examiner

*Primary Examiner* — Wesley Kim
*Assistant Examiner* — Dong-Chang Shiue
(74) *Attorney, Agent, or Firm* — Robert M. Downey, P.A.

(57) ABSTRACT

A protective implement for portable electronic devices such as, but not limited to, smartphones, tablets and laptops includes a set of self-holding protective members that fit tightly on the corners of an electronic device without the need for tools or adhesives. Each protective member fits onto a respective corner of the electronic device and includes a shell formed of a generally rigid material (e.g., plastic, polycarbonate, ABS, silicon, metals, or wood) and an inner shock absorbing material such as, but not limited to, a rubber-like material that frictionally engages the top and bottom of the electronic device at the corner. The shell may be structured to receive a U-shaped spring element to assist with holding the protective member on the corner of the electronic device.

6 Claims, 5 Drawing Sheets

PROTECTIVE IMPLEMENT FOR ELECTRONIC DEVICES

BACKGROUND OF THE INVENTION

This Non-Provisional Patent Application is based on previously filed Provisional Patent Application Nos. 62/100,277 filed on Jan. 6, 2015 and 62/256,021 filed on Nov. 16, 2015.

FIELD OF THE INVENTION

The present invention relates to protective implements for electronic devices and, more particularly, to a protection system that includes one or more members that fit onto the exterior of an electronic device to protect the electronic device from forces of impact.

Discussion of the Related Art

Electronic devices (i.e., smartphones, laptops, mp3 players, cameras, etc.) are often very fragile and are not able to withstand shock forces, such as forces of impact when falling and hitting the ground surface. Therefore, casing systems, pouches or bags are used to protect electronic devices. However, most portable electronic devices are designed to be aesthetically and functionally appealing, which generally has a strong influence on the buying choice. Available protection products (casing systems, pouches and bags) hide the devices' design and sometimes impair their functionalities. For instance, protective cases will typically make an electronic device longer, wider and thicker and limit the access to the full functionality of the intended device's design. Some users also take the risk of leaving their electronic devices unprotected because of the cumbersomeness of protective systems. The most fragile zone of portable electronic devices tends to be the corners and the screen. When an electronic device falls on a flat surface, the corners have greater odds of being hit than any other part of the device. The shock from impact of the corner with a hard surface is then transferred to the rest of the device's frame and internal parts. Finally, the deformation of the frame often brakes internal parts and the screen. If the corners could be well protected, the damages following the fall of an electronic device would be considerably reduced.

SUMMARY OF THE INVENTION

The present invention is directed to a protective implement for portable electronic devices such as, but not limited to, smartphones, tablets and laptops. In particular, the invention includes a set of self-holding protective members that fit tightly on the corners of an electronic device without the need for tools or adhesives. Each protective member fits onto a respective corner of the electronic device and includes a protective shell formed of a generally rigid material (e.g., plastic, polycarbonate, ABS, silicon, metals, or wood) and an inner shock absorbing material such as, but not limited to, a rubber-like material that frictionally engages the top, bottom and edges of the electronic device at the corner. The protective shell may be structured to receive a U-shaped spring element to assist with holding the protective member on the corner of the electronic device.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Referring to the several views of the drawings, the present invention is directed to a system for protecting portable electronic devices such as, but not limited to, smartphones, tablets and laptops, and more particularly to a protective implement, generally indicated as 10 for protecting the corners of portable electronic devices from shock forces of impact.

The protective implement 10 of the present invention includes a set of self-holding protective members 12, each of which is designed and intended to be tightly fitted to a respective corner of an electronic device in a manner that protectively covers the top surface, edges and bottom surface of the electronic device at the corners.

Figure 1:
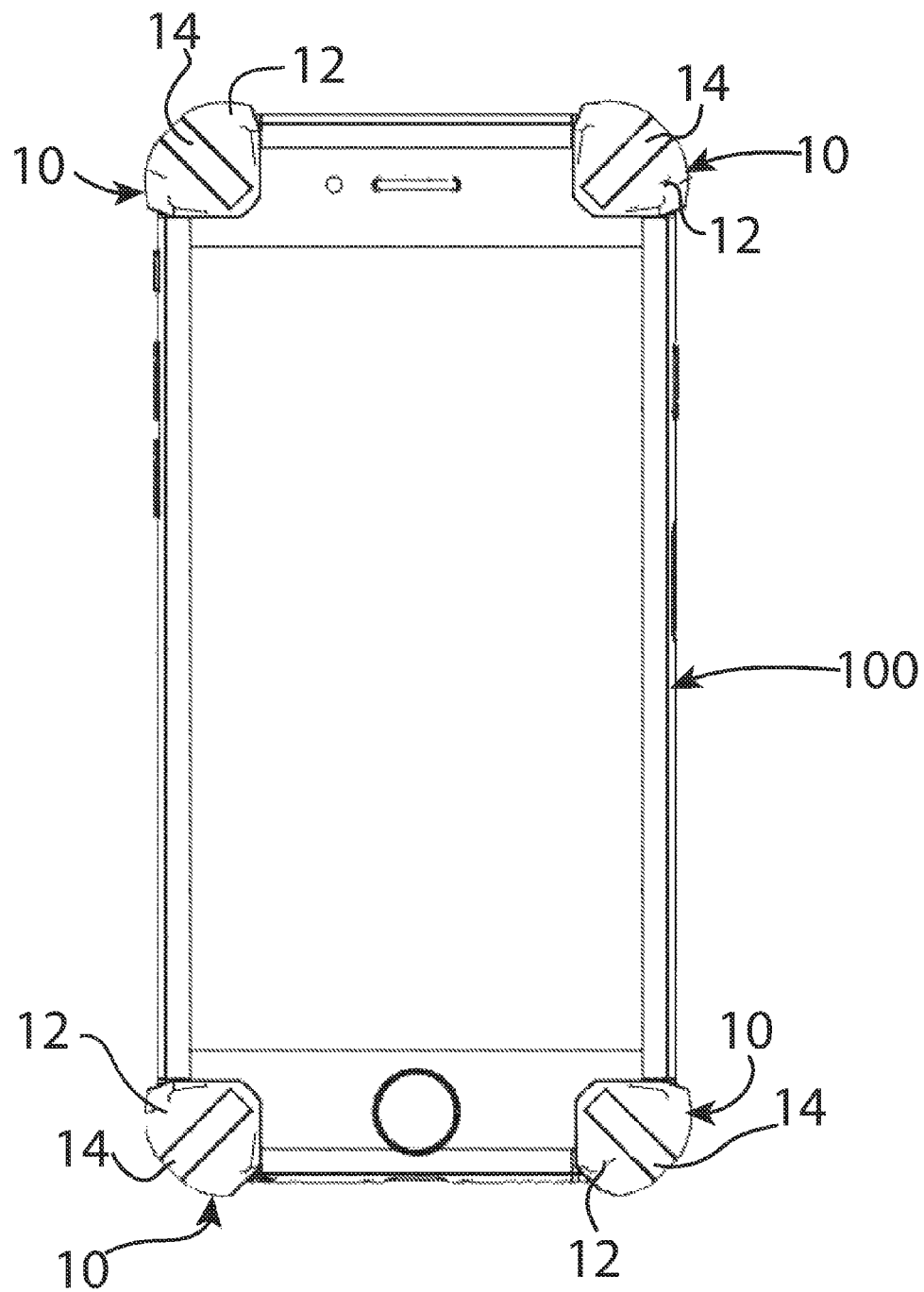
FIG. 1 is a top plan view of a smartphone (i.e., APPLE iPHONE 6) showing the protective implement of the present invention installed, wherein protective members are fitted onto each of the four corners of the smartphone in accordance with a preferred embodiment thereof.
Figure 2:
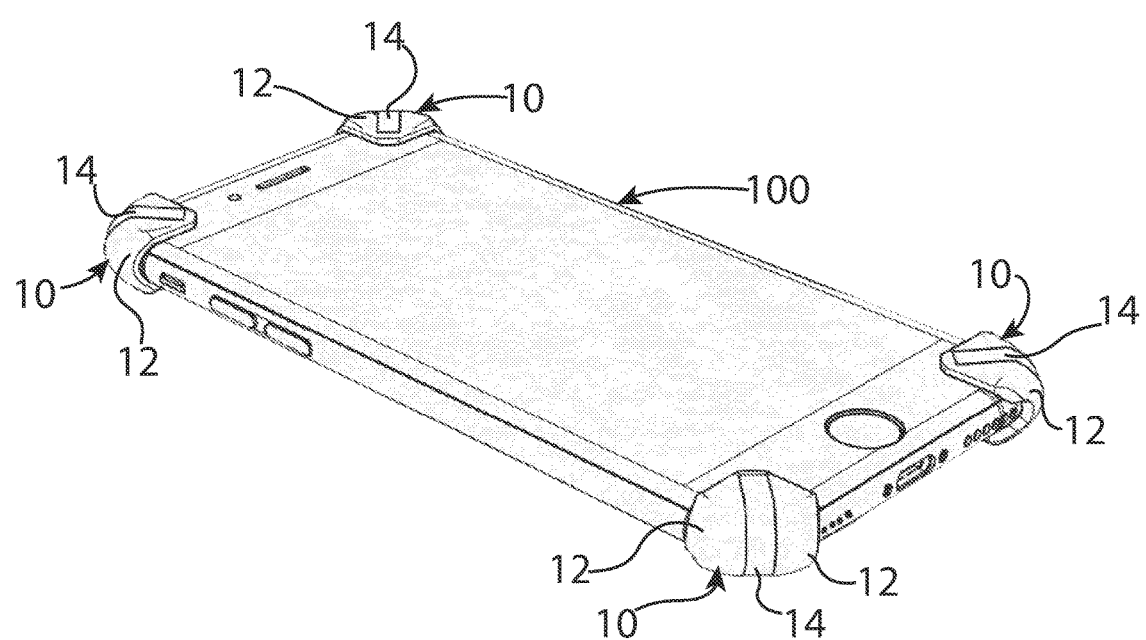
FIG. 2 is a top perspective view of the smartphone of FIG. 1 showing the protective members of the present invention fitted to the four corners of the smartphone.

Referring initially to FIGS. 1 and 2, an example of an electronic device 100 is shown. In this particular example, the electronic device 100 is an APPLE iPHONE 6. The protective members 12 are slid on to each corner of the electronic device 100 by hand, without the need for tools, and are held in place without the use of adhesives. Once fitted onto the respective corner, no further manipulation of the protective members is needed. In the embodiment shown in FIGS. 1-4, U-shaped metal or plastic spring elements 14 are used to tightly secure each protective member 12 to a corner of the electronic device 100. In particular, the U-shaped spring elements 14 are received within a groove 15 formed in the outer shell of each protective member 12, as best seen in FIG. 4. Each U-shaped spring element 14 is specifically structured to exert an inward compression force on a top portion 20 and bottom portion 22 of the protective member, urging the top portion 20 and bottom portion 22 towards one another and into frictional, tight fitting engagement with the top and bottom surfaces of the electronic device, as seen in FIGS. 1 and 2. It should be noted that the protective members 12 may be made to have their own spring memory that urges the top portion 20 and bottom portion 22 against the respective top and bottom surfaces of the electronic device 100 without the need for the U-shaped spring element 14.

Figure 3:
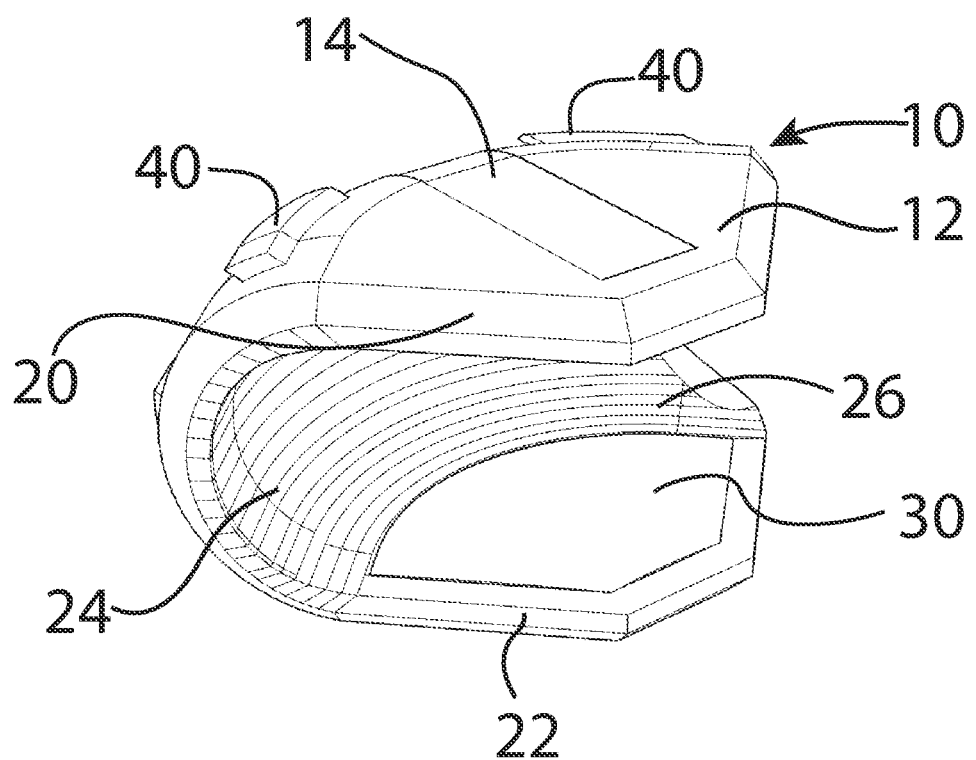
FIG. 3 is a top, inner perspective view of a protective member of the present invention that is specifically designed for self-holding attachment onto one of the corners of the electronic device without the use of tools or adhesives.
Figure 4:
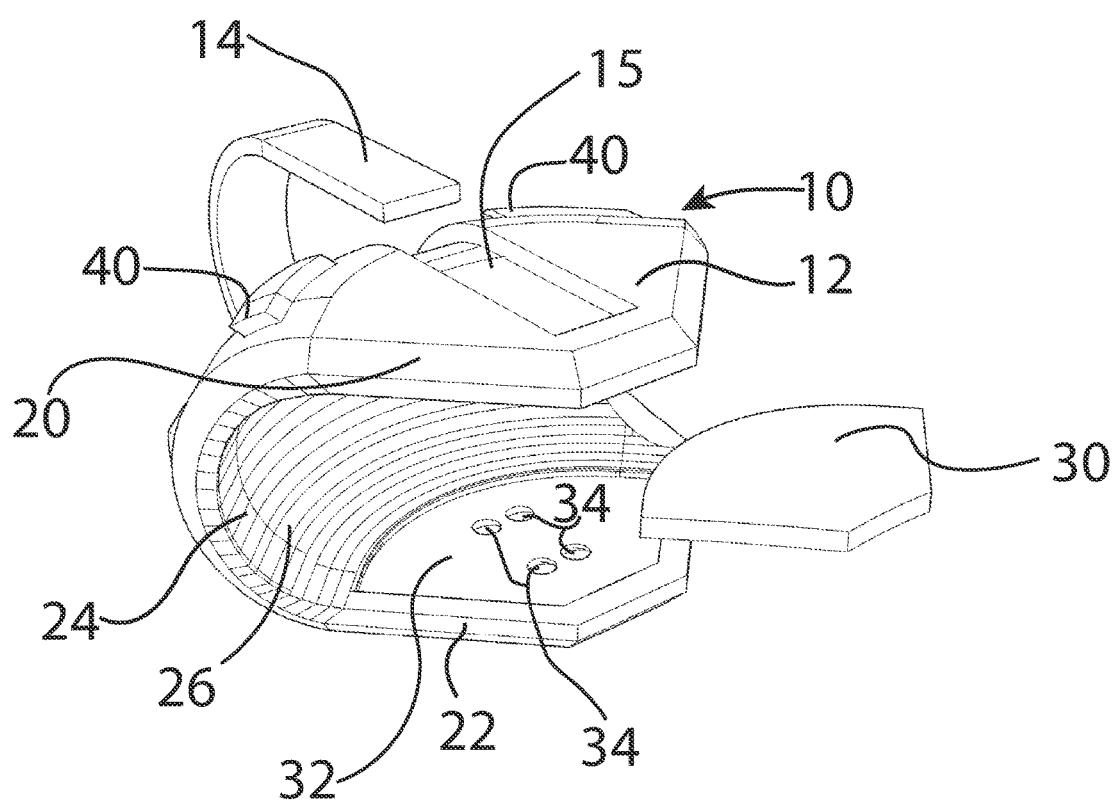
FIG. 4 is an exploded perspective view of the protective member of FIG. 3 illustrating separation of a shock absorbing pad from an inner bottom portion of the protective member and separation of a U-shaped spring element from the outer shell of the protective member.
Figure 5:
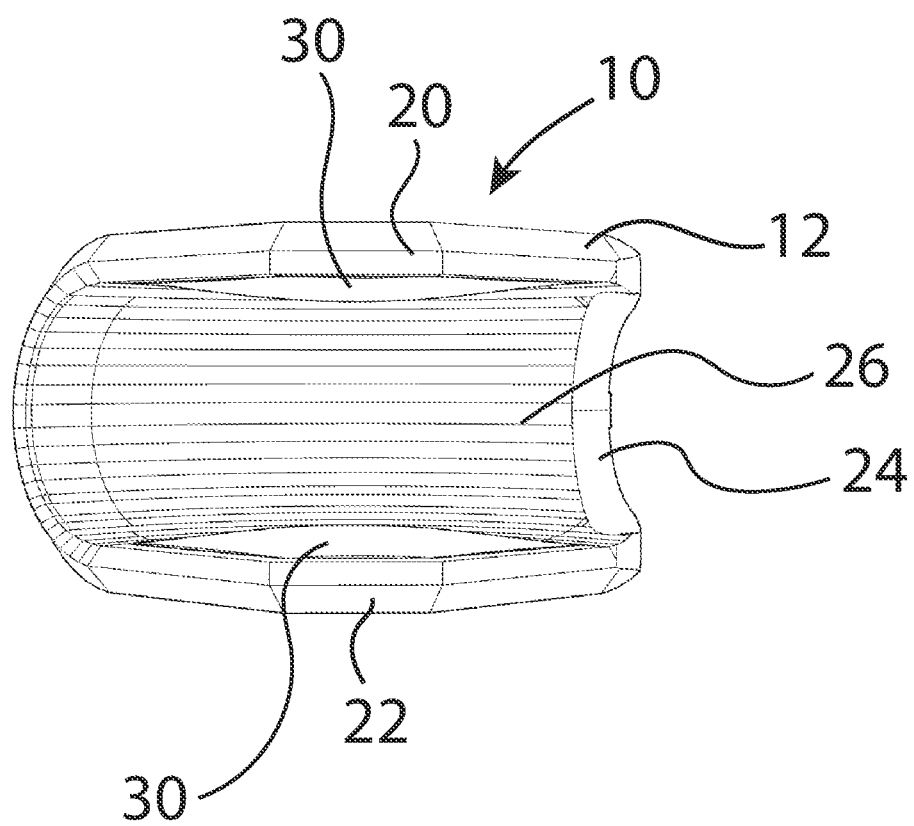
FIG. 5 is a front elevational view of the protective member of the present invention illustrating shock absorbing pads on the inner facing upper and lower portions of the protective member for frictional, shock absorbing engagement with the top and bottom surfaces of the electronic device.

Referring to FIGS. 3-5, each protective corner member 12 includes an integrally formed shell made of a generally hard material such as, but not limited to, plastic, polycarbonate, ABS, silicon, metals, or wood. The shell defines the overall size, shape and configuration of the protective member 12 and includes the top portion 20, the bottom portion 22 and a middle portion 24 that extends between the top portion 20 and the bottom portion 22. The middle portion 24 is curved to conform with the corner of the electronic device. More specifically, the middle portion 24 is shaped and configured to conform with the exterior corner configuration of a particular make and model of an electronic device such as, for example, the APPLE iPHONE 6. The top portion 20 and bottom portion 22 extend from the middle portion 24 and are spaced from one another to form a gap that is sized for snug fitted receipt of a corner of the electronic device 100 therein, between the top portion 20 and bottom portion 22. The top portion 20 and bottom portion 22 have inner facing surfaces that are disposed in opposing relation to one another. In a preferred embodiment, the inner surface 26 of the middle portion 24 is generally hard and of the same material as the outer shell. However, it should be noted that the inner surface 26 may be made to include a shock absorbing layer of material, such as a rubber-like material.

Each protective member further includes shock absorbing pads 30 fitted to an inner facing surface of the top portion 20 and the bottom portion 22. Specifically, as seen in FIG. 4, a recessed area 32 is formed on the inner facing surfaces of the bottom portion 22, as well as the top portion 20 (not shown) for receiving the congruently configured shock absorbing pad 30. In a preferred embodiment, the shock absorbing pad 30 is formed of a suitable shock absorbing material such as, but not limited to, an elastomeric or rubber-like material that not only provides shock absorbing characteristics but also provides a frictionally engaging surface for gripping the top and bottom surfaces of the electronic device 100 at the corners, thereby holding each protective member 12 tightly fitted in operative position on the corners of the electronic device 100 without the use of adhesives. The recessed areas 32 for receiving the shock absorbing pads 30 may be provided with pocket holes 34 to receive a correspondingly configured portion of the shock absorbing pads 30 therein, thereby providing a stronger hold and grip and to discourage separation of the shock absorbing pads 30 from the shell structure of the protective members 12.

The outer surface of the middle portion 24 of the protective members may be provided with protruding bumpers 40 for engaging external surfaces and providing additional resistance to shock resulting from impact of the corners of the electronic device with external surfaces and objects.

It is noted that while the protective implement 10 shown in the accompanying drawings is designed for the APPLE iPHONE 5, iPHONE 5s and iPHONE 6 models, the drawings and above description serve as examples of the present invention which is not limited to the APPLE iPHONE line of products. It is fully contemplated that the protective implement of the present invention will be applied to a variety of different makes and models of portable electronic devices, including those that have yet to be released.

While the present invention has been shown and described in accordance with a preferred and practical embodiment, it is recognized that departures from the instant disclosure are fully contemplated within the spirit and scope of the present invention which is not to be limited except as defined in the following claims as interpreted under the Doctrine of Equivalents.

What is claimed is:

1. A protective implement for a portable electronic device comprising:
   at least one protective member structured and disposed to fit onto a corner of the portable electronic device, and the at least one protective member including:
      a shell defining a main body with an exterior surface, and the shell including a top portion, a bottom portion and a middle portion extending between the top portion and the bottom portion, and the top portion and the bottom portion extending from the middle portion in spaced relation to one another, and the top portion and the bottom portion each having an inner facing side, and the inner facing sides of the respective top and bottom portions being disposed in opposing, spaced relation to one another, and normally biased towards one another under spring force to form a gap between the inner facing sides of the top portion and the bottom portion, and the gap being sized and configured to slidably and snugly receive the corner of the portable electronic device into the gap and between the top portion and the bottom portion while causing the top portion and bottom portion to be urged away from one another against the spring force so that the inner facing sides remain in tight fitted grasping engagement against the portable electronic device;
      a pair of pads formed of a shock absorbing material and fitted to the top and bottom portions and including a first pad that is flush with the inner facing side of the top portion and a second pad that is flush with the inner facing side of the bottom portion, and the first and second pads being structured and disposed to frictionally engage the portable electronic device when the at least one protective member is fitted onto the corner of the portable electronic device, and the first and second pads being structured and disposed for absorbing shock resulting from externally applied forces to an exterior surface of the at least one protective member when the at least one protective member is fitted onto a corner of the portable electronic device; and
      a plurality of bumpers each formed as a separate protrusion on the exterior surface of the shell, and the plurality of bumpers being structured and disposed for engaging external surfaces and for providing resistance to shock resulting from impact of the at least one protective member with the external surfaces.

2. The protective implement as recited in claim 1 further comprising:
   a plurality of the protective members each being sized, structured and configured for removable attachment onto a respective corner of the portable electronic device without the use of tools or adhesives.

3. The protective implement as recited in claim 2 wherein the shock absorbing material is an elastomeric material.

4. A protective implement for a portable electronic device comprising:
   at least one protective member structured and disposed to fit onto a corner of the portable electronic device, and the at least one protective member including:
      a shell defining a main body with an exterior surface, and the shell including a top portion, a bottom portion and a middle portion extending between the top portion and the bottom portion, and the top portion and the bottom portion extending from the middle portion in spaced relation to one another, and the top portion and the bottom portion each having an inner facing side, and the inner facing sides of the respective top and bottom portions being disposed in opposing, spaced relation to one another, and normally biased towards one another under spring force to form a gap between the inner facing sides of the top portion and the bottom portion, and the gap being sized and configured to slidably and snugly receive the corner of the portable electronic device into the gap and between the top portion and the bottom portion while causing the top portion and bottom portion to be urged away from one another against the spring force so that the inner facing sides remain in tight fitted grasping engagement against the portable electronic device; and a pair of pads formed of a shock absorbing material and fitted to the top and bottom portions and including a first pad that is flush with the inner facing side of the top portion and a second pad that is flush with the inner facing side of the bottom portion, and the first and second pads being structured and disposed to frictionally engage the portable electronic device when the at least one protective member is fitted onto the corner of the portable electronic device, and the first and second pads being structured and disposed for absorbing shock resulting from externally applied forces to an exterior surface of the at least one protective member when the at least one protective member is fitted onto a corner of the portable electronic device.

5. The protective implement as recited in claim 4 further comprising:

a plurality of the protective members each being sized, structured and configured for removable attachment onto a respective corner of the portable electronic device without the use of tools or adhesives.

6. The protective implement as recited in claim 5 wherein the shock absorbing material is an elastomeric material.

* * * * *